United States Patent [19]

Stellmach

[11] Patent Number: 5,039,085
[45] Date of Patent: Aug. 13, 1991

[54] DEVICE FOR EDGE-SENSING OF A TRANSPORTED RECORDING MATERIAL CARRIER

[75] Inventor: Dieter Stellmach, Bad Dürrheim, Fed. Rep. of Germany

[73] Assignee: Mannesmann Aktiengesellschaft, Düsseldorf, Fed. Rep. of Germany

[21] Appl. No.: 429,380

[22] Filed: Oct. 31, 1989

[30] Foreign Application Priority Data

Oct. 31, 1988 [DE] Fed. Rep. of Germany ....... 3837250

[51] Int. Cl.⁵ .............................................. B65H 7/02
[52] U.S. Cl. .................................. 271/227; 271/245; 271/258
[58] Field of Search .......................... 271/227, 245, 258

[56] References Cited

U.S. PATENT DOCUMENTS 2,227,202 12/1940 Schmidt .............................. 271/227
4,708,456 11/1987 Shibata ............................ 271/227 X Primary Examiner—Richard A. Schacher
Attorney, Agent, or Firm—Horst M. Kasper

[57] ABSTRACT

A sensing device is disclosed for sensing the front edge (1a) or the rear edge (1b) of a recording material carrier (1) in a processing apparatus, wherein a feeler probe lever (2) rests on the spring-supported switching element (3a) of a microswitch (3), and wherein the connection terminal contacts (5a, 5b) of the microswitch (3) are connected to an electronic control or, respectively, display circuit (4). The invention device presents a purely mechanical, economically produceable sensing device which functions for all kinds of recording material carriers and which is wear-resistant and allows to determine with high accuracy the front edge (1a) or the rear edge (1b) of a recording material carrier (1). A first feeler lever arm (2a), pivotable into the recording material carrier path (6), forms at its tip (9) a detent stop face (11) perpendicular in stop position (10) and rectangular or nearly rectangular for the front edge (1a) of the recording material carrier (1) relative to the path of the recording material carrier.

22 Claims, 1 Drawing Sheet

DEVICE FOR EDGE-SENSING OF A TRANSPORTED RECORDING MATERIAL CARRIER

BACKGROUND OF THE INVENTION

1. Field of the Invention

The invention relates to a device for sensing the front edge or the end edge of a recording material carrier in a processing apparatus including a feeler probe lever, which feeler probe lever rests on the spring-supported switching element of a microswitch and of an electronic control or display circuit connected to the connection contacts of the microswitch.

2. Brief Description of the Background of the Invention Including Prior Art

Such sensing devices for sensing the front edge or the end edge of a recording material carrier serve for recognizing of recording material carriers such as paper sheets, paper tapes, continuous unrolled paper and their position, in order to initiate a certain printing or processing step. In addition, the absence of the recording material carrier is registered.

Optical sensors are conventionally employed for recognizing the front edge of the paper. The optical sensors operate either according to the transmission or reflex principle. These optical sensors are associated with the disadvantage of requiring particular equipment and thus result in expensive adjustments depending on the optical spectrum of the surface of the paper material to be sensed. Extraordinary difficulties occur in case of transparent and colored recording material carriers. The adjustment of the different kinds of recording material carriers is further made more difficult by a possible presence of extrinsic light irradiation and by temperature increases occurring during apparatus operation and by deposits of dust.

In addition, according to the state of the art, a sensing lever is employed on a controlled tiltable frame for recognition of the recording material carrier front edge, which sensing lever cooperates with a light barrier or with an inductively acting transmitter pick-up device (Mannesmann-Kienzle Printer D 245). Such sensor devices based on a sensing lever construction act on optical or, respectively, inductive transmitter pick-up devices and are indeed reliable. However, these sensor devices require more equipment, in particular based on the separately controlled pivotable frame, and are relatively expensive in their production.

It is further known from German Patent Application Laid Open DE-OS 2,943,241 to construct a paper end switching device for a printer based on a feeler sensor subjected to a top load exerted by a lever sitting on top of the paper path, which lever is tiltable at one end around an axis parallel to the paper path and cross to the transport direction. An iron switching strip is disposed on the side of the paper path disposed opposite to the lever, which switching strip is pivotable around a pivot axis disposed parallel to the lever axis based on the effect and operation of the moving and extending lever against the action of a spring, wherein the switching strip actuates by the pivoting motion a switch of the printer. The lever carries a permanent magnet at its other rear end relative to the transport direction, which permanent magnet has one pole face directed toward the input side tilting part of the switching strip, and the one pole face of the permanent magnet can be set onto the input side pivoting part in a pivoting position of the switching strip by tilting of the lever in transport direction of a passed through continuous paper. In the pivot position of the switching strip the input side pivot part is pivoted in the direction of the permanent magnet under the effect and interaction of the permanent magnet. Such a paper end switching device is not only equipment-requiring but does also not contribute anything to a precise determination of the position of a front edge or of a rear end edge of a recording material carrier.

SUMMARY OF THE INVENTION

1. Purposes of the Invention

It is an object of the invention to create a purely mechanical sensing device, which can be produced economically and which can be adapted to numerous kinds of recording material carriers.

It is a further object of this invention to provide a sensing device which is wear-resistant and particularly suitable to determine with high precision the front edge or the rear edge of a recording material carrier.

It is yet a further object of the invention to provide a sensing device for movable recording material carrier sheets, which sensing device is constructed for a safe and an accurate determination of a respective position of a paper sheet at a defined time.

These and other objects and advantages of the present invention will become evident from the description which follows.

2. Brief Description of the Invention

The present invention provides for a sensing structure for sensing individual end edges of a recording material carrier advancing in a processing apparatus. A first feeler probe lever arm is mounted to the rotation axle and tilted in its rest position into the path of the recording material carrier. A second feeler probe lever arm is mounted to the rotation axle and forms with the first feeler probe lever arm a feeler probe lever. A tip is disposed at an end of the first feeler lever arm forming a stop face disposed perpendicular to the advance direction of the recording material carrier. The tip forms a stop position relative to the advancing recording material carrier such that a front edge of the recording material carrier impinges in a perpendicular direction onto the stop position. A microswitch includes a spring-supported switching element and has connection terminal contacts. The feeler probe lever rests on the spring-supported switching element. An electronic processing circuit is connected to the connection terminal contacts of the microswitch.

A hub can surround the axle for mounting the feeler probe lever. The first feeler probe lever arm can form in the region of the hub a protrusion resting against the spring-supported switching element based on the spring force of the switching element. The hub can be substantially centered between the first feeler probe lever arm and the second feeler probe lever arm. The hub can be pivotably supported via the axle at the support frame. The first feeler lever arm, tiltable into the path of the recording material carrier, can have a lower inert mass than the second feeler lever arm, disposed remote relative to the path of the recording material carrier. The moment of inertia relative to the axle of the first feeler lever arm, tiltable into the path of the recording material carrier, can be lower than the moment of inertia relative to the axle of the second feeler lever arm, disposed remote relative to the path of the recording material carrier. The moment of inertia of the first feeler lever arm, tiltable into the path of the recording material carrier, can be lower than the sum of the moment of inertia relative to the axle of the second feeler lever arm, disposed remote relative to the path of the recording material carrier, and the moment of inertia exerted by the spring force of the microswitch in the released position of the first feeler probe lever arm. The moment of inertia of the first feeler lever arm, tiltable into the path of the recording material carrier, can be in the rest position at the position of the tip by a force of from about 0.2 to 5 pound, and preferably 1 to 3 pound, lower than the sum of the moment of inertia relative to the axle of the second feeler lever arm, disposed remote relative to the path of the recording material carrier, and of the moment of inertia exerted by the spring force of the microswitch in the released position of the first feeler probe lever arm.

A prismatic-shaped entrance for the recording material carrier attached to the support frame can be furnished in the area of the tip of the first feeler lever arm with an opening for accommodating through-passage of at least one feeler probe lever arm end. The prismatic-shaped entrance can be formed by an upper section, a lower section, an input opening, and an output opening. The upper section can be made up of a first part section near the output opening and a second part section near the input opening. The second part section and the lower section can be inclined such that the input opening can be wider than the output opening and such that the recording material carrier direction can be disposed between the second part section and the lower part section. The first part section can form an angle of from about 0 to 10 degrees, and preferably from about 0 to 5 degrees, with the advance direction of the recording material carrier. The lower section can form an angle of from about 10 to 40 degrees, and preferably from about 20 to 30 degrees, relative to the advance direction of the recording material carrier. The second part section can form an angle of from about one to two times the angle between lower section and advance direction of the recording material carrier relative to the advance direction of the recording material carrier. The width of the lower section can be from about two to three times the width of the first part section.

The feeler probe lever can have a center of mass which can have a distance from the axle of less than one fifth of the distance between the tip of the first feeler probe lever arm and the axle. A connection line between a center of mass of the first feeler probe lever arm and a center of mass of the second feeler probe lever arm can form an angle of from about 20 to 45 degrees relative to the advance direction of the recording material carrier in the rest position of the feeler probe lever.

The microswitch can be disposed adjustable at the support frame of the processing apparatus.

The sensing device according to the invention includes a first feeler probe lever arm pivotable into the path of the recording material carrier. The feeler probe lever arm forms at its tip a stop face perpendicular to the contact position and rectangular or nearly rectangular for the front edge of a recording material carrier relative to the path of the recording material carrier. The position of the surface of the stop face is substantially perpendicular to the advance direction of the recording material carrier and can form an angle of from about 70 to 110 degrees and preferably from about 80 to 100 degrees relative to the advance direction of the recording material carrier. This sensing device construction can be produced particularly economically based on the simple elements employed in the construction. The sensing device is extremely safe in its functioning, and it is wear-resistant and, in particular, it allows to determine the front edge and/or the rear edge of a moving recording material carrier with high precision. Elements such as springs or control members are not required. At the same time, the force action onto the paper front edge is maintained at a low level, which is advantageous in case of lever transmissions for the microswitch to be employed.

According to a preferred embodiment of the invention, the first feeler lever arm forms in the region of the hub a protrusion resting against the spring-supported switching element. The kinematic coupling of the feeler lever to the microswitch thereby becomes particularly simple and safe. In this case, a lever transmission is employed which takes into consideration the low actuating forces and switching paths of the microswitches. In case of a switching force of 10 pound required at the microswitch, only a force of 2 pound is needed at the front edge of the recording material carrier. The necessary force to be exerted by the advancing recording material carrier is minimized by an interaction direction of the advancing recording material carrier which is substantially perpendicular to the stop surface of the sensing device.

A further improvement of the invention comprises that the feeler lever is formed as a double-arm lever and that a hub is disposed approximately in the middle between the first and the second feeler lever arm. The hub is rotatably supported at an apparatus frame of the processing apparatus. The first feeler lever arm, pivotable into the path of the recording material carrier, is associated with a lower inert mass than the second feeler lever arm, disposed remote relative to the path of the recording material carrier. Based on the different torque moments alone, it is possible to maintain the feeler lever always in the path of the recording material carrier with the first feeler lever arm.

A hooking, catching or entangling of the recording material carrier at the feeler lever is avoided based on a further feature of the invention in that a conical funnel or shaft-shaped entrance for the recording material carrier with openings for at least one feeler lever is provided in the area of the tip of the first feeler lever arm. A wear of the feeler lever is therefore additionally reduced.

The switching accuracy, i.e. the switching power the recording material carrier with the first feeler lever microswitch, can be very precisely set by positioning the microswitch in an adjustable fashion at the carrier frame of the processing apparatus.

A method for sensing individual end edges of a recording material carrier advancing in a processing apparatus comprises the following steps: A path is furnished for advancing a recording material carrier. A first feeler probe lever is mounted to a rotation axle. The first feeler probe arm is tilted in its rest position into the path of the recording material carrier. Recording material is advanced on the path for recording material. A tip is impacted with a front edge of the recording material carrier. The tip is disposed at an end of the first feeler lever arm. The tip forms a stop face disposed perpendicular to the advance direction of the recording material carrier and a stop position relative to the advancing recording material carrier such that a front edge of the recording material carrier impinges in a perpendicular direction onto the stop position. A spring-supported switching element of a microswitch is actuated with the feeler probe lever. The feeler probe lever rests on the spring supported switching element. An electronic processing circuit connected to connection terminal contacts of the microswitch is switched.

The hub can be substantially centered between the first feeler probe lever arm and the second feeler probe lever arm. The hub can be pivotably supported via the axle at the support frame. The moment of inertia of the first feeler lever arm, tiltable into the path of the recording material carrier, can be furnished to a value lower than the sum of the moment of inertia relative to the axle of the second feeler lever arm, disposed remote relative to the path of the recording material carrier, and the moment of inertia exerted by the spring force of the microswitch in the released position of the first feeler probe lever arm.

The position of the microswitch can be adjusted at the support frame of the processing apparatus.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

DESCRIPTION OF INVENTION AND PREFERRED EMBODIMENT

Figure 1:
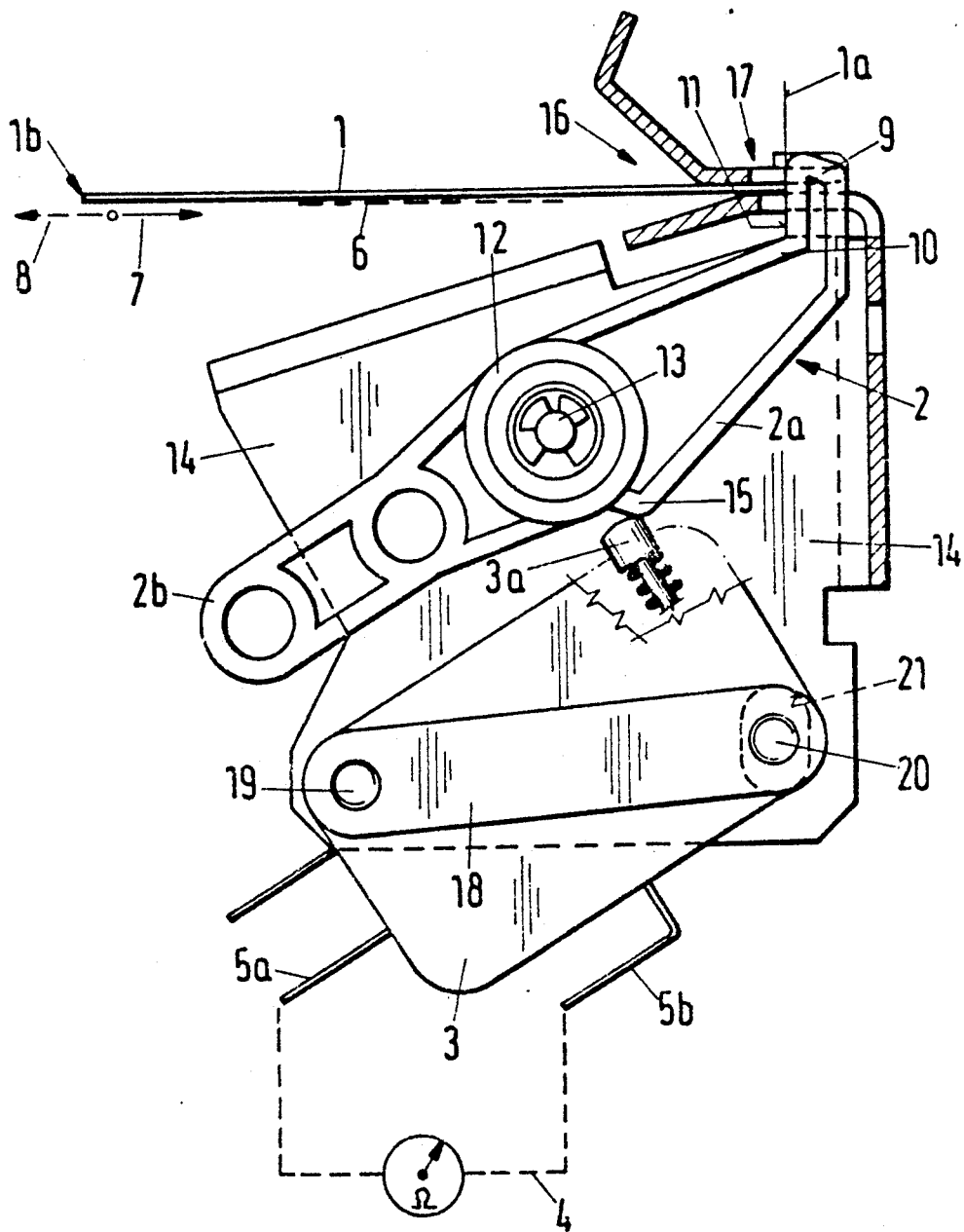
FIG. 1 illustrates a side view of the sensing device as seen in a direction perpendicular to the forward advance direction of the recording material carrier.

In accordance with the present invention, there is provided a device for sensing the front edge 1a or the rear edge 1b of a recording material carrier 1 in a processing apparatus, with a feeler probe lever 2. The feeler probe lever 2, resting on the spring-supported switching element 3a of a microswitch 3, includes an electronic control or, respectively, display circuit 4 including the connection terminal contacts 5a, 5b of the microswitch 3. A first feeler lever arm 2a, tiltable into the path 6 of the recording material carrier 1, forms at its tip 9 a stop face 11. The stop face 11 is disposed vertical in stop position 10 and disposed at a substantially right angle as seen in the direction of motion of the front edge 1a of the recording material carrier 1.

The first feeler lever arm 2a can form in the region of a hub 12 a protrusion 15 resting against the spring-supported switching element 3a.

The feeler lever 2 can be formed as a double-armed lever and can include a hub 12 substantially centered between the first feeler lever arm 2a and a second feeler lever arm 2b. The hub 12 can be pivotably supported at a support frame 14 of the processing apparatus. The first feeler lever arm 2a, tiltable into the path 6 of the recording material carrier 1, can have a lower inert mass than the second feeler lever arm 2b, disposed remote relative to the path 6 of the recording material carrier 1.

A prismatic conical funnel-shaped entrance 16 for the recording material carrier 1 can be furnished with openings 17 for at least one feeler probe lever 2 in the area of the tip 9 of the first feeler lever arm 2a.

The microswitch 3 can be disposed adjustable at the support frame 14 of the processing apparatus.

The sensing device can be employed for the front edge 1a or the rear edge 1b of a recording material carrier 1. The sensing device is disposed in the paper feed path of a processing apparatus such as, for example, a printer and, in particular, a matrix printer, a bank document processing or a record processing apparatus, or processing and printer apparatus for similar recording materials including paper, records, and other documents.

The sensing device exhibits a feeler lever 2. A spring-supported switching element 3a of a microswitch 3 rests on the feeler lever 2. The microswitch 3 initiates a display in an electronic control or, respectively, display circuit 4. The display circuit 4 is connected via the connection terminal contacts 5a and 5b to the microswitch 3.

The recording material carrier 1 is moved either along its path 6 in advance direction 7 or in reverse direction 8. The feeler lever 2 pivots in this path 6 with a first feeler lever arm 2a, wherein the tip 9 of the feeler lever arm 2a forms in the stop position 10 a vertical or rectangular or approximately rectangular stop face 11 for the front edge 1a of the recording material carrier 1. The normal vector of the stop face is in rest position directed substantially parallel to the recording material carrier advance direction. Several of such feeler lever arms 2a can be provided distributed over the width of the recording material carrier 1 in a symmetrical or in an asymmetrical fashion.

The feeler lever arm 2a is attached at a hub 12 which is pivotably supported around an axis 13 in a support frame 14 of the processing apparatus. The first feeler lever arm 2a forms a protrusion 15 resting continuously against the spring-supported switching element 3a in the area of the hub 12. In this case, the feeler lever 2 is formed as a two-armed lever, i.e., it includes in addition to the first feeler lever arm 2a also a second feeler lever arm 2b. Furthermore, the hub 12 rests about at the center between the first feeler lever arm 2a and the second feeler lever arm 2b. The first feeler lever arm 2a, pivotable into the path 6 of the recording material carrier 1, exhibits a smaller inert mass than the second feeler lever arm 2b, disposed remote from the path 6, such that the feeler lever arm 2b, generating continuously a larger torque, induces the first feeler lever arm 2a to tilt with the tip 9 into the path 6 of the recording material carrier 1. The advance motion of the recording material carrier 1 with the front edge 1a induces the tip 9 of the feeler lever arm 2a to pivot into such a position that the stop face 11 stands perpendicular or nearly perpendicular to the advance direction of the recording material carrier or in a vertical upright position. In this position, the protrusion 15 generates a sufficiently large force in order to actuate the switching element 3a.

The recording material carrier 1 is led and/or guided before the contacting of the feeler lever 2 via a conical funnel or shaft-shaped entrance 16, where, in each case, an opening 17 for the feeler lever 2 is provided. The funnel-shaped or shaft-shaped entrance 16 is essentially an elongated trough having an open bottom, which can be approximated by a right prism having lateral faces either formed by the guiding faces of the entrance or by the openings for input and output of the entrance. The entrance 16 is coordinated in its distance and in its effective path to the position of the tip 9 of the first feeler lever arm 2a.

The switching force and the switching path of the spring-supported switching element 3a of the microswitch 3 can be adjusted very accurately. For this purpose, the microswitch 3 is disposed adjustable at the support frame 14 of the processing apparatus. The microswitch 3 is attached at the bracket or cover plate 18 by way of set screws 19 and 20, wherein the set screw 20 can be adjusted in the support frame 14 via an elongated hole 21.

The contact point of the feeler lever arm 2a in rest position with the axis 13 of the hub 12 forms an angle of from about 30 to 60 degrees and preferably from about 40 to 50 degrees relative to the plane of the advancing paper. The distance of the contact point of the feeler lever arm 2a in rest position with the front edge 1a of the paper can have a distance from the center of the axis 13 which is from about 2 to 10 times, and preferably from about 4 to 6 times, the distance of the contact point between the feeler lever arm 2a and the spring-supported switching element 3a of the microswitch 3 relative to the axis 13. The spring-supported switching element 3a of the microswitch 3 can further serve as a stop for the feeler lever arm 2a to maintain the feeler lever arm 2a in a proper rest position. The extension of the perpendicular plane formed by the tip 9 of the feeler lever arm 2a can have a width which corresponds to from about 178 to 1/10, and preferably from about ¼ to ⅛, of the distance between the axis 13 of the feeler lever 2 with the front paper edge 1a. Preferably, the spring-supported switching element 3a of the microswitch 3 is movable in a direction tangential relative to a circle around the axis 13 including the contact point between the feeler lever arm 2a and the spring-supported switching element 3a of the microswitch 3.

The conical funnel or shaft-shaped entrance 16 is preferably constructed such that it supports the advancing recording material carrier 1 in such a way that a displacement o; this carrier 1 from the straight path is rendered more difficult based on interaction with the tip 9 of the feeler lever arm 2a. In particular, the entrance 16 is constructed such that a possibility of a downward tilting or directing of the advancing carrier 1 is avoided based on an upward rising direction of the lower part guiding face of the entrance surrounding the carrier 1 in the conical funnel or shaft-shaped entrance 16. Preferably, the lower output delimiting surface forms an angle of from about 20 to 40, and preferably 25 to 30, degrees relative to the advancing paper, whereas the upper plane in the end section forms an angle of from about 0 to 5 degrees relative to the paper advance direction. Preferably, the upper side of the input device is formed from two sections canted relative to each other, where the first section is formed by the part forming an angle from about 0 to 5 degrees with the advancing paper and by a second section forming an angle which is from about 1.5 to 2.5 times the angle which the lower part guiding face of the entrance forms with the paper advance direction. The lower part guiding face can have an extension of from about 2 to 4 times relative to the substantially horizontally disposed upper section of the entrance 16.

Preferably, the feeler lever arm 2a is formed of sheet metal which is bent or of plastic. The feeler lever arm is attached such that it forms a hollow inner part, and the arm is attached and pivotably supported in the area of the hub 12. This allows an increased stability of the stop face 11 of this feeler lever arm 2a, while increasing its strength against deformation. The distance of the output of the entrance for the recording material carrier 1 can be from about 0.5 to 2 times the length of the upper section disposed substantially horizontally, i.e. parallel at an angle between from about 0 to 5 degrees relative to the advancing paper direction. The angle of the rotation of the feeler lever arm 2a, required for safe switching of the microswitch 3, amounts to from about 3 to 15 degrees and is preferably from about 4 to 8 degrees. The disposition of the microswitch 3 relative to the feeler lever arm 2a is preferably on a side substantially opposite to the side of the feeler lever arm 2a contacted by the advancing carrier 1. Preferably, an angle of from about 45 to 90 degrees is formed by a line between the contact point of the feeler lever arm 2a with the advancing paper and by the line between the contact point of the feeler lever arm 2a with the spring-supported switching element 3a of the microswitch 3.

It will be understood that each of the elements described above, or two or more together, may also find a useful application in other types of sensing devices and probes for movement of materials differing from the types described above.

While the invention has been illustrated and described as embodied in the context of a device for sensing the start or the end of a recording material carrier in a processing apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sensing structure for sensing individual end edges of a recording material carrier advancing in a processing apparatus comprising
    a path for advancing a recording material carrier;
    a rotation axle;
    a first feeler probe lever arm mounted to the rotation axle and tilted in its rest position into the path of the recording material carrier;
    a second feeler probe lever arm mounted to the rotation axle and forming with the first feeler probe lever arm a feeler probe lever, and wherein the torque of the second feeler probe lever arm provides substantially the force maintaining the first feeler probe lever arm in its rest position;
    a tip disposed at an end of the first feeler lever arm forming a stop face disposed perpendicular to the advance direction of the recording material carrier and forming a stop position relative to the advancing recording material carrier such that a front edge of the recording material carrier impinges in a perpendicular direction onto the stop position;
    a microswitch including a spring-supported switching element and having connection terminal contacts, wherein the feeler probe lever rests on the spring-supported switching element; and
    an electronic processing circuit connected to the connection terminal contacts of the microswitch.

2. The sensing structure according to claim 1 further comprising
   a support frame;
   a prismatic-shaped entrance for the recording material carrier attached to the support frame is furnished in the area of the tip of the first feeler lever arm with an opening for accommodating through-passage of at least one feeler probe lever arm end.

3. The sensing structure according to claim 2 wherein the prismatic-shaped entrance is formed by an upper section, a lower section, an input opening, and an output opening.

4. The sensing structure according to claim 3
   wherein the upper section is made up of a first part section near the output opening and a second part section near the input opening;
   wherein the second part section and the lower section are inclined such that the input opening is wider than the output opening and such that the recording material carrier direction is disposed between the second part section and the lower part section;
   wherein the first part section forms an angle of from about 0 to 10 degrees with the advance direction of the recording material carrier;
   wherein the lower section forms an angle of from about 10 to 40 degrees relative to the advance direction of the recording material carrier;
   wherein the second part section forms an angle of from about one to two times the angle between lower section and advance direction of the recording material carrier relative to the advance direction of the recording material carrier;
   wherein the width of the lower section is from about two to three times the width of the first part section.

5. The sensing structure according to claim 3 wherein the upper section is made up of a first part section near the output opening and a second part section near the input opening;
   wherein the first part section forms an angle of from about 0 to 5 degrees with the advance direction of the recording material carrier;
   wherein the lower section forms an angle of from about 20 to 30 degrees relative to the advance direction of the recording material carrier.

6. The sensing structure according to claim 1 wherein the feeler probe lever has a center of mass which has a distance from the axle of less than one fifth of the distance between the tip of the first feeler probe lever arm and the axle.

7. The sensing structure according to claim 1 wherein a connection line between a center of mass of the first feeler probe lever arm and a center of mass of the second feeler probe lever arm forms an angle of from about 20 to 45 degrees relative to the advance direction of the recording material carrier in the rest position of the feeler probe lever.

8. The sensing structure according to claim 1, further comprising
   a support frame, wherein the microswitch is disposed adjustable at the support frame of the processing apparatus.

9. A sensing structure for sensing individual end edges of a recording material carrier advancing in a processing apparatus comprising
   a path for advancing a recording material carrier;
   a rotation axle;
   a first feeler probe lever arm mounted to the rotation axle and tilted in its rest position into the path of the recording material carrier;
   a second feeler probe lever arm mounted to the rotation axle and forming with the first feeler probe lever arm a feeler probe lever, and wherein the torque of the second feeler probe lever arm provides substantially the force maintaining the first feeler probe lever arm in its rest position;
   a tip disposed at an end of the first feeler lever arm forming a stop face disposed perpendicular to the advance direction of the recording material carrier and forming a stop direction relative to the advancing recording material carrier such that a front edge of the recording material carrier impinges in a perpendicular direction onto the stop position;
   a microswitch including a spring-supported switching element and having connection terminal contacts, wherein the feeler probe lever rests on the spring-supported switching element;
   an electronic processing circuit connected to the connection terminal contacts of the microswitch; and
   a hub surrounding the axle for mounting the feeler probe lever, wherein the first feeler probe lever arm forms in the region of the hub a protrusion resting against the spring-supported switching element based on the spring force of the switching element.

10. The sensing structure according to claim 9 further comprising
    a support frame, wherein the hub is substantially centered between the first feeler probe lever arm and the second feeler probe lever arm and wherein the hub is pivotably supported via the axle at the support frame, and wherein the first feeler lever arm, tiltable into the path of the recording material carrier, has a lower inert mass than the second feeler lever arm, disposed remote relative to the path of the recording material carrier.

11. The sensing structure according to claim 9 further comprising
    a support frame, wherein the hub is substantially centered between the first feeler probe lever arm and the second feeler probe lever arm and wherein the hub is pivotably supported via the axle at the support frame, and wherein the moment of inertia relative to the axle of the first feeler lever arm, tiltable into the path of the recording material carrier, is lower than the moment of inertia relative to the axle of the second feeler lever arm, disposed remote relative to the path of the recording material carrier.

12. The sensing structure according to claim 9 further comprising
    a support frame, wherein the hub is substantially centered between the first feeler probe lever arm and the second feeler probe lever arm and wherein the hub is pivotably supported via the axle at the support frame, and wherein the moment of inertia of the first feeler lever arm, tiltable into the path of the recording material carrier, is lower than the sum of the moment of inertia relative to the axle of the second feeler lever arm, disposed remote relative to the path of the recording material carrier, and the moment of inertia exerted by the spring force of the microswitch in the released position of the first feeler probe lever arm.

13. The sensing structure according to claim 12, wherein the moment of inertia of the first feeler lever arm, tiltable into the path of the recording material carrier, is in the rest position at the position of the tip by a force of from about 0.2 to 5 pound lower than the sum of the moment of inertia relative to the axle of the second feeler lever arm, disposed remote relative to the path of the recording material carrier, and of the moment of inertia exerted by the spring force of the microswitch in the released position of the first feeler probe lever arm.

14. The sensing structure according to claim 12, wherein the moment of inertia of the first feeler lever arm, tiltable into the path of the recording material carrier, is in the rest position at the position of the tip by a force of from about 1 to 3 pound lower than the sum of the moment of inertia relative to the axle of the second feeler lever arm, disposed remote relative to the path of the recording material carrier, and of the moment of inertia exerted by the spring force of the microswitch in the released position of the first feeler probe lever arm.

15. A device for sensing the front edge (1a) or the rear edge (1b) of a recording material carrier (1) in a processing apparatus, with a two-armed feeler probe lever (2), which lever (2) rests on the spring-supported switching element (3a) of a microswitch (3) substantially based on the action of gravity forces on the arms of the two-armed feeler probe lever and which device includes an electronically controlled display circuit (4) including the connection terminal contacts (5a, 5b) of the microswitch (3), wherein a first feeler lever arm (2a), tiltable into the path (6) of the recording material carrier (1), at its tip (9) forms a stop face (11), disposed vertical in stop position (10) and disposed at a substantially right angle as seen in the direction of motion of the front edge (1a) of the recording material carrier (1).

16. The sensing device according to claim 15, wherein the first feeler lever arm (2a) forms in the region of a hub (12) a protrusion (15) resting against the spring-supported switching element (3a).

17. The sensing device according to claim 15, wherein the feeler lever (2) is formed as a double-armed lever and includes a hub (12) substantially centered between the first feeler lever arm (2a) and a second feeler lever arm (2b), which hub (12( is pivotably supported at a support frame (14) of the processing apparatus, and wherein the first feeler lever arm (2a), tiltable into the path (6) of the recording material carrier (1), has a lower inert mass than the second feeler lever arm (2b), disposed remote relative to the path (6) of the recording material carrier (1).

18. The sensing device according to claim 15, wherein a prismatic conical funnel-shaped entrance (16) for the recording material carrier (1) is furnished in the area of the tip (9) of the first feeler lever arm (2a) with openings (17) for at least one feeler probe lever (2).

19. The sensing device according to claim 15, wherein the microswitch (3) is disposed adjustable at the support frame (14) of the processing apparatus.

20. A method for sensing individual end edges of a recording material carrier advancing in a processing apparatus comprising furnishing a path for advancing a recording material carrier;

mounting a double-arm feeler probe lever to a rotation axle; placing the double-arm feeler probe lever into a rest position in the path of the recording material carrier and maintaining the feeler probe lever by gravity force in the rest position;

advancing recording material on the path for recording material;

impacting a tip with a front edge of the recording material carrier, where the tip is disposed at an end of a first arm of the double-arm feeler lever probe for forming a stop face disposed perpendicular to the advance direction of the recording material carrier and for forming a stop position relative to the advancing recording material carrier such that a front edge of the recording direction carrier impinges in a substantially perpendicular direction onto the stop position and moves the double-arm feeler probe lever against gravity forces acting on the double-arm feeler probe lever;

actuating a spring-supported switching element of a microswitch with the moving double-arm feeler probe lever, wherein the double-arm feeler probe lever engages the spring supported switching element against the spring force of the spring support of the microswitch; and switching an electronic processing circuit connected to connection terminal contacts of the microswitch.

21. The method for sensing individual end edges of a recording material carrier according to claim 20, wherein the hub is substantially centered between the first feeler probe lever arm and a second feeler probe lever arm and wherein the hub is pivotably supported via the axle at the support frame; and further comprising furnishing a moment of inertia of the first feeler lever arm, placed into the path of the recording material carrier, to a value lower than the sum of the moment of inertia relative to the axle of the second feeler lever arm, disposed remote relative to the path of the recording material carrier.

22. The method for sensing individual end edges of a recording material carrier according to claim 20 further comprising adjusting the position of a microswitch contact point with the double-arm feeler probe lever at the support frame of the processing apparatus.

* * * * *